United States Patent
Ganz et al.

(10) Patent No.: US 12,462,037 B2
(45) Date of Patent: Nov. 4, 2025

(54) DIRECTED FUZZING FOR VULNERABILITY DETECTION

(71) Applicant: SAP SE, Walldorf (DE)

(72) Inventors: Tom Ganz, Karlsruhe (DE); Martin Haerterich, Wiesloch (DE); Philipp Rall, Darmstadt (DE)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 18/079,611

(22) Filed: Dec. 12, 2022

(65) Prior Publication Data

US 2024/0184891 A1 Jun. 6, 2024

Related U.S. Application Data

(60) Provisional application No. 63/419,079, filed on Oct. 25, 2022.

(51) Int. Cl.
*G06F 21/57* (2013.01)
*G06F 11/3698* (2025.01)
*G06F 21/56* (2013.01)

(52) U.S. Cl.
CPC ........ *G06F 21/577* (2013.01); *G06F 11/3698* (2025.01); *G06F 21/563* (2013.01); *G06F 2221/033* (2013.01)

(58) Field of Classification Search
CPC .................................................. G06F 21/577
See application file for complete search history.

(56) References Cited

U.S. PATENT DOCUMENTS

| | | | |
|---|---|---|---|
| 8,719,791 B1 | 5/2014 | Macpherson et al. | |
| 10,380,350 B1 * | 8/2019 | Ben Porath | G06F 11/3684 |
| 10,621,361 B2 * | 4/2020 | Holz | G06F 16/338 |
| 10,885,020 B1 * | 1/2021 | Ablitt | G06F 16/2365 |
| 11,544,626 B2 * | 1/2023 | Adeli-Nadjafi | G06N 20/00 |
| 11,564,101 B2 * | 1/2023 | Fu | H04W 12/106 |
| 11,816,102 B2 * | 11/2023 | Parravicini | G06F 40/30 |
| 11,816,221 B2 * | 11/2023 | Singh | G06F 21/577 |
| 11,882,143 B1 * | 1/2024 | Garcia Correa | H04L 63/1433 |

(Continued)

OTHER PUBLICATIONS

"U.S. Appl. No. 18/079,665, Final Office Action mailed Mar. 21, 2025", 29 pgs.

(Continued)

*Primary Examiner* — Viral S Lakhia
(74) *Attorney, Agent, or Firm* — SCHWEGMAN LUNDBERG & WOESSNER, P.A.

(57) ABSTRACT

Applications may contain vulnerabilities to attack via malicious inputs. Machine-learning models may be trained to detect these vulnerabilities by accepting source code as input and outputting a probability that each of a set of vulnerabilities exists in the source code. Explanation methods may identify one or more locations within the source code that are likely to cause the vulnerability. Directed fuzzing provides a range of inputs to source code. The inputs that cause the source code to fail are detected and the portions of the source code that were vulnerable are identified. The results of the directed fuzzing are used to select between explanations generated by multiple explanation methods, to provide additional training data to a machine-learning model, to provide additional training data to an explanation method, or any suitable combination thereof.

20 Claims, 10 Drawing Sheets

(56) References Cited

U.S. PATENT DOCUMENTS

| | | | |
|---|---|---|---|
| 12,153,684 B2* | 11/2024 | Chan | G06F 21/577 |
| 2006/0288332 A1 | 12/2006 | Sagar et al. | |
| 2012/0204062 A1 | 8/2012 | Erickson et al. | |
| 2015/0095894 A1 | 4/2015 | Tripp | |
| 2018/0232523 A1 | 8/2018 | Copty et al. | |
| 2019/0340103 A1* | 11/2019 | Nelson | G06F 11/3624 |
| 2019/0362077 A1 | 11/2019 | Schornack et al. | |
| 2019/0370473 A1 | 12/2019 | Matrosov et al. | |
| 2020/0394311 A1 | 12/2020 | Li et al. | |
| 2020/0401504 A1* | 12/2020 | Sommers | G06F 11/3664 |
| 2021/0056211 A1* | 2/2021 | Olson | G06N 3/08 |
| 2021/0279338 A1* | 9/2021 | Bowman | G06F 21/577 |
| 2022/0253533 A1 | 8/2022 | Choi | |
| 2023/0104814 A1* | 4/2023 | Johnson | G06F 21/577 726/25 |
| 2023/0146443 A1 | 5/2023 | Huth et al. | |
| 2023/0169164 A1* | 6/2023 | Bishop, III | G06F 21/563 726/23 |
| 2023/0169177 A1* | 6/2023 | Bishop, III | G06F 8/71 726/25 |
| 2023/0281317 A1 | 9/2023 | Clement et al. | |
| 2023/0325301 A1 | 10/2023 | Feng et al. | |
| 2024/0028740 A1* | 1/2024 | Chan | G06F 21/577 |
| 2024/0045971 A1* | 2/2024 | Ben Salem | G06F 21/54 |
| 2024/0184892 A1 | 6/2024 | Ganz et al. | |

OTHER PUBLICATIONS

"U.S. Appl. No. 18/079,665, Examiner Interview Summary mailed Apr. 22, 2025", 3 pgs.

"U.S. Appl. No. 18/079,665, Non Final Office Action mailed Sep. 12, 2024", 22 pgs.

"U.S. Appl. No. 18/079,665, Examiner Interview Summary mailed Oct. 18, 2024", 3 pgs.

"U.S. Appl. No. 18/079,665, Response filed Dec. 12, 2024 to Non Final Office Action mailed Sep. 12, 2024", 14 pgs.

Allamanis, Miltiadis, "Learning to represent programs with graphs", ICLR, [Online]. Retrieved from the Internet: URL: https: arxiv.org pdf 1711.00740.pdf, (May 4, 2018), 17 pgs.

Arusoaie, Andrei, "A Comparison of Open-Source Static Analysis Tools for Vulnerability Detection in C C++ Code", 19th International Symposium on Symbolic and Numeric Algorithms for Scientific Computing (SYNASC), (2017), 8 pgs.

Ben-Nun, "Neural Code Comprehension: A Learnable Representation of Code Semantics", [Online] Retrieved from the internet:https: arxiv.org abs 1806.07336, (2018), 1-17.

Bohme, Marcel, "Directed Greybox Fuzzing", Session K2: Fuzzing Finer and Faster, CCS'17, Dallas, TX, USA, (Oct. 30-Nov. 3, 2017), 16 pgs.

Burkart, Nadia, "A Survey on the Explainability of Supervised Machine Learning", Journal of Artificial Intelligence Research 70, (Jan. 2021), 245-317.

Chakraborty, Saikat, "Deep Learning based Vulnerability Detection: Are We There Yet?", IEEE Transactions on Software Engineering, vol. TBD, (Sep. 3, 2020), 19 pgs.

Chen, Hongxu, "Hawkeye: Towards a Desired Directed Grey-box Fuzzer", [Online] Retrieved from the internet: https: doi.org 10.1145 3243734.3243849, (Oct. 15-19, 2018), 14 pgs.

Ferrante, J., "The Program Dependence Graph and Its Use in Optimization", ACM Transactions on Programming Languages and Systems, 9 319-349, (Jul. 1987), 31 pgs.

Ganz, Tom, "Explaining Graph Neural Networks for Vulnerability Discovery", Session 2B: Machine Learning for Cybersecurity, AISec '21, Virtual Event, Republic of Korea, (Nov. 15, 2021), 12 pgs.

Griecox, Gustavo, "Toward large-scale vulnerability discovery using Machine Learning", 12 pgs.

Guo, Wenbo, "LEMNA: Explaining Deep Learning based Security Applications", Session 2D: ML 2, CCS'18, Toronto, ON, Canada, (Oct. 15-19, 2018), 16 pgs.

Klees, George, "Evaluating Fuzz Testing", Session 10D: VulnDet 2 + Side Channels 2, CCS'18, Toronto, ON, Canada, (Oct. 15-19, 2018), 16 pgs.

Li, Zhen, "SySeVR: A Framework for Using Deep Learning to Detect Software Vulnerabilities", IEEE Transactions on Dependable and Secure Computing, (Jan. 12, 2021), 15 pgs.

Li, Zhen, "VulDeePecker: A Deep Learning-Based System for Vulnerability Detection", Network and Distributed Systems Security (NDSS) Symposium, [Online] Retrieved from the internet:http: dx.doi.org 10.14722ndss.2018.23158, (Feb. 18-21, 2018), 15 pgs.

Luo, Dongsheng, "Parameterized Explainer for Graph Neural Network", 34th Conference on Neural Information Processing Systems (NeurIPS 2020), Vancouver, Canada, (2020), 12 pgs.

Manes, Valentin J.M., "The Art, Science, and Engineering of Fuzzing: A Survey", (Apr. 8, 2019), 21 pgs.

Mazuera-Rozo, Alejandro, "Shallow or Deep? An Empirical Study on Detecting Vulnerabilities using Deep Learning", Both authors contributed equally to this manuscript, (Mar. 22, 2021), 12 pgs.

Mikolov, Tomas, "Distributed Representations of Words and Phrases and their Compositionality", arXiv:1310.4546v1 [cs.CL], (Oct. 16, 2013), 9 pgs.

Osterlund, Sebastian, "ParmeSan: Sanitizer-guided Greybox Fuzzing", Open access to the Proceedings of the 29th USENIX Security Symposiumis sponsored by USENIX, [Online] Retrieved from the internet:https: www.usenix.org conference usenixsecurity20 presentation osterlund, (Aug. 12-14, 2020), 19 pgs.

Russell, Rebecca L, "Automated Vulnerability Detection in Source Code Using Deep Representation Learning", 17th IEEE International Conference on Machine Learning and Applications, (2018), 7 pgs.

Sanchez-Lengeling, Benjamin, "Evaluating Attribution for Graph Neural Networks", 34th Conference on Neural Information Processing Systems (NeurIPS 2020), Vancouver, Canada, (2020), 13 pgs.

Selvaraju, Ramprassaath R., "Grad-CAM: Visual Explanations from Deep Networks via Gradient-based Localization", Proceedings of the IEEE International Conference on Computer Vision (ICCV), (2017), 618-626.

Smilkov, Daniel, "SmoothGrad: removing noise by adding noise", Sharper sensitivity maps: removing noise by adding noise, (Jun. 12, 2017), 10 pgs.

Warnecke, Alexander, "Evaluating Explanation Methods for Deep Learning in Security", IEEE European Symposium on Security and Privacy (EuroSandP), (2020), 17 pgs.

Wu, Zonghan, "A Comprehensive Survey on Graph Neural Networks", Journal of Latex Class Files, vol. XX, No. XX, (Dec. 4, 2019), 22 pgs.

Yamaguchi, Fabian, "Modeling and Discovering Vulnerabilities with Code Property Graphs", IEEE Symposium on Security and Privacy, [Online]. Retrieved from the Internet: URL: https: comsecuris. com papers 06956589.pdf, (2014), 590-604.

Ying, Rex, "GNNExplainer: Generating Explanations for Graph Neural Networks", 33rd Conference on Neural Information Processing Systems (NeurIPS 2019), Vancouver, Canada., (2019), 12 pgs.

Zhou, Yaqin, "Devign: Effective Vulnerability Identification by Learning Comprehensive Program Semantics via Graph Neural Networks", 33rd Conference on Neural Information Processing Systems (NeurIPS 2019), Vancouver, Canada, (2019), 11 pgs.

Zou, Deqing, "Interpreting Deep Learning-based Vulnerability Detector Predictions Based on Heuristic Searching", ACM Trans. Softw. Eng. Methodol., vol. 37, No. 4, Article 111, (Aug. 2018), 33 pgs.

\* cited by examiner

```
#include <iostream>
using namespace std;
int main() {
    char *buf;                      ~ 410
    try {
        buf = new char[32];
    }
    catch (var1&) {                 ~420A
        cout << "Error allocating memory." << endl;
        return 0;
    }
    buff[33] = 'a';
    delete [] buf;                  ~ 430
    return 0;                       ~420B
}
```

FIG. 4

DIRECTED FUZZING FOR VULNERABILITY DETECTION

CLAIM OF PRIORITY

This application claims the benefit of prior U.S. Provisional Application No. 63/419,079, filed on Oct. 25, 2022, which is incorporated by reference herein in its entirety.

TECHNICAL FIELD

The subject matter disclosed herein generally relates to vulnerability detection in source code. Specifically, the present disclosure addresses systems and methods to use and improve machine learning models to detect vulnerabilities in source code.

BACKGROUND

Classical static code analyzers search for known patterns of insecure code, including the usage of functions associated with buffer overflow risks, format string problems, race condition and poor random number acquisition. They take the source code's textual representation, match it against the known patterns and sort the results by risk which then can be mapped to probabilities.

Machine-learning models are applications that provide computer systems the ability to perform tasks, without explicitly being programmed, by making inferences based on patterns found in the analysis of data. Machine learning explores the study and construction of algorithms, also referred to herein as models, that may learn from existing data and make predictions about new data. The dimensions of the input data are referred to as features.

Machine-learning models may be used to detect vulnerabilities in source code. The source code is provided as an input to one or more machine learning models, and the models identify locations in the source code that contain vulnerabilities. Different machine-learning models may identify different vulnerability locations in the same source code. Compared to classic static code analyzers, learning-based approaches do not have a fixed rule set; they rather optimize their weights given pre-labeled data such that vulnerabilities are classified accordingly.

Explanation methods (EMs) enable tracing back the decision of a machine-learning model to features of the input. As applied to machine-learning models for detecting vulnerabilities in source code, EMs pinpoint code structures responsible for a predicted vulnerability. Different EMs may identify different code structures for the same machine-learning model and predicted vulnerability.

BRIEF DESCRIPTION OF THE DRAWINGS

Some embodiments are illustrated by way of example and not limitation in the figures of the accompanying drawings.

FIG. 4 is an example of source code, according to some example embodiments, suitable for use in using directed fuzzing for vulnerability detection.

DETAILED DESCRIPTION

Figure 1:
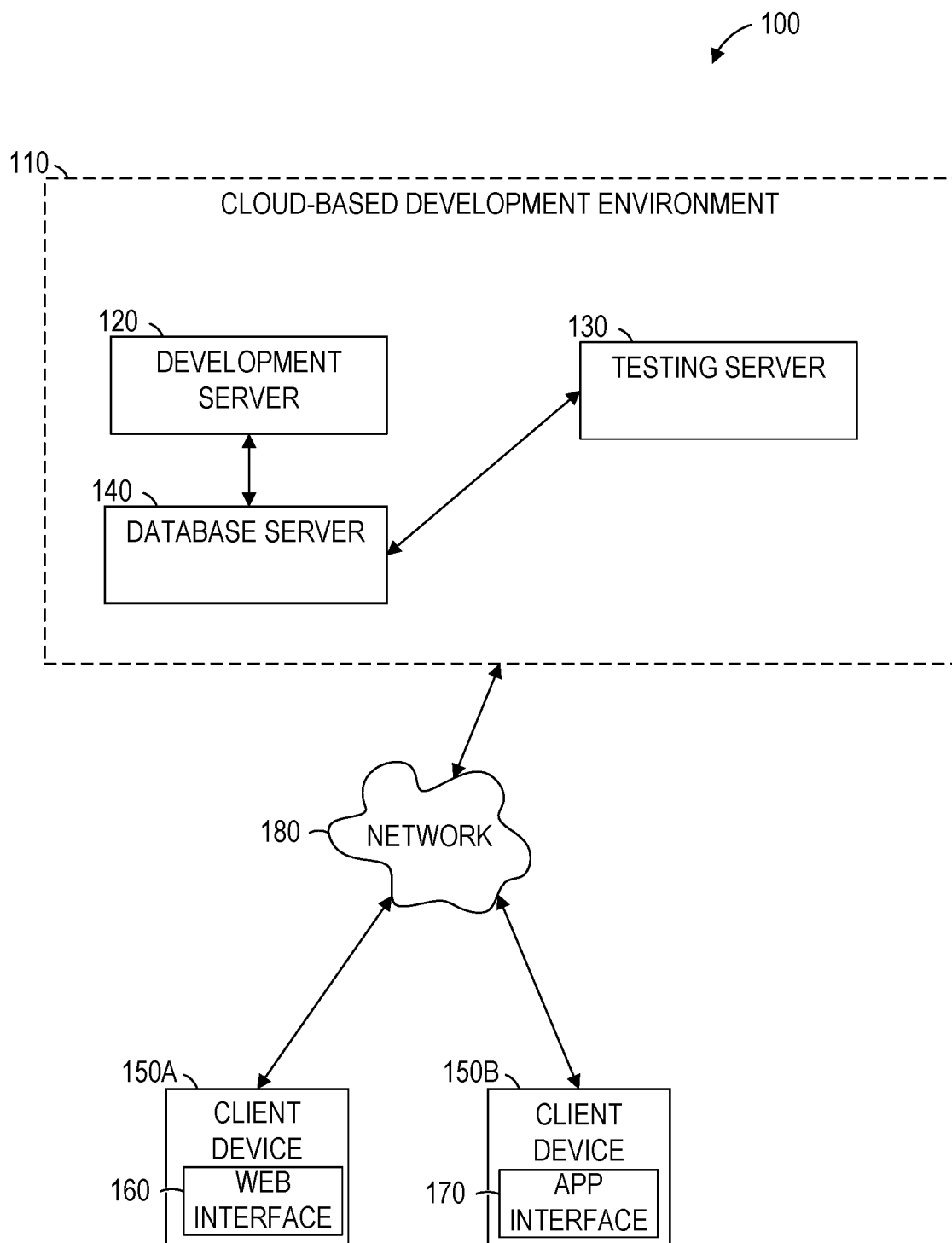
FIG. 1 is a network diagram illustrating a network environment suitable for using directed fuzzing for vulnerability detection, according to some example embodiments.

Example methods and systems are directed to directed fuzzing for vulnerability detection. Applications may contain vulnerabilities to attack via malicious inputs. For example, a character buffer may be allocated to a fixed size, but user input may be copied to the character buffer without checking if the input fits within the fixed size. As another example, user input may be inserted into a string used for a database query without checking if the input contains control characters that modify the expected operation of the database. Machine-learning models may be trained to detect these vulnerabilities by accepting source code as input and outputting a probability that each of a set of vulnerabilities exists in the source code. Explanation methods may accept source code and a vulnerability as input and identify one or more locations within the source code that are likely to cause the vulnerability. Directed fuzzing provides a range of inputs to source code. The inputs that cause the source code to fail (e.g., to core dump, to modify read-only data, to access off-limits data, or any suitable combination thereof) are detected and the portions of the source code that were vulnerable are identified.

The machine-learning models are trained using a training set. Each element of the training set is an input for the machine learning model (e.g., an input data object). By processing the training set, the internal variables of the machine learning model are adjusted so that the error rate of the machine learning model is minimized. If the training set is large and representative of data not included in the training set, the trained model will have comparable results on other data. For vulnerability detection, each element of the training set is source code and a classification of the source code as containing or not containing each of a set of vulnerabilities.

Unlabeled source code may be provided as an input to the machine-learning model to identify proposed vulnerabilities. The proposed vulnerabilities are provided as input to one or more explanation methods. The explanation methods identify one or more locations in the source code that may cause the identified vulnerabilities. Directed fuzzing is used to provide a range of inputs to the identified locations. As a result of the directed fuzzing, observed vulnerabilities and their observed locations are identified. The observed vulnerabilities may be used as labels for the source code and used to train the machine-learning model. The observed vulnerability/location pairs may be used to select from among multiple explanation methods to improve the quality of vulnerability information presented to a user.

When these effects are considered in aggregate, one or more of the methodologies described herein may obviate a need for certain efforts or resources that otherwise would be involved in determining vulnerabilities of source code. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating a network environment 100 suitable for using directed fuzzing for vulnerability detection, according to some example embodiments. The network environment 100 includes a cloud-based development environment 110, client devices 150A and 150B, and a network 180. The cloud-based development environment 110 includes a development server 120, a testing server 130, and a database server 140. The development server 120 provides a software development environment (e.g., a source control system, a compiler, a debugger, or any suitable combination thereof). The software may access application data (e.g., application data stored by the database server 140) to provide one or more applications to the client devices 150A and 150B via a web interface 160 or an application interface 170. For example, the development server 120 may allow a developer using the application interface 170 to modify source code, compile the source code, and test the source code.

The development server 120, the testing server 130, the database server 140, and the client devices 150A and 150B may each be implemented in a computer system, in whole or in part, as described below with respect to FIG. 10. The client devices 150A and 150B may be referred to collectively as client devices 150 or generically as a client device 150.

The testing server 130 tests the software being developed for vulnerabilities. For example, failure to check the size of input character strings may cause a buffer overrun, allowing for malicious or unintended modification of memory. As another example, failure to check the content of input strings used to customize database queries may allow for a format string attack that compromises data in a database. By testing the source code, these and other vulnerabilities may be identified before the software is put into production, improving security.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The development server 120, the testing server 130, the database server 140, and the client devices 150A-150B are connected by the network 180. The network 180 may be any network that enables communication between or among machines, databases, and devices. Accordingly, the network 180 may be a wired network, a wireless network (e.g., a mobile or cellular network), or any suitable combination thereof. The network 180 may include one or more portions that constitute a private network, a public network (e.g., the Internet), or any suitable combination thereof.

Figure 2:
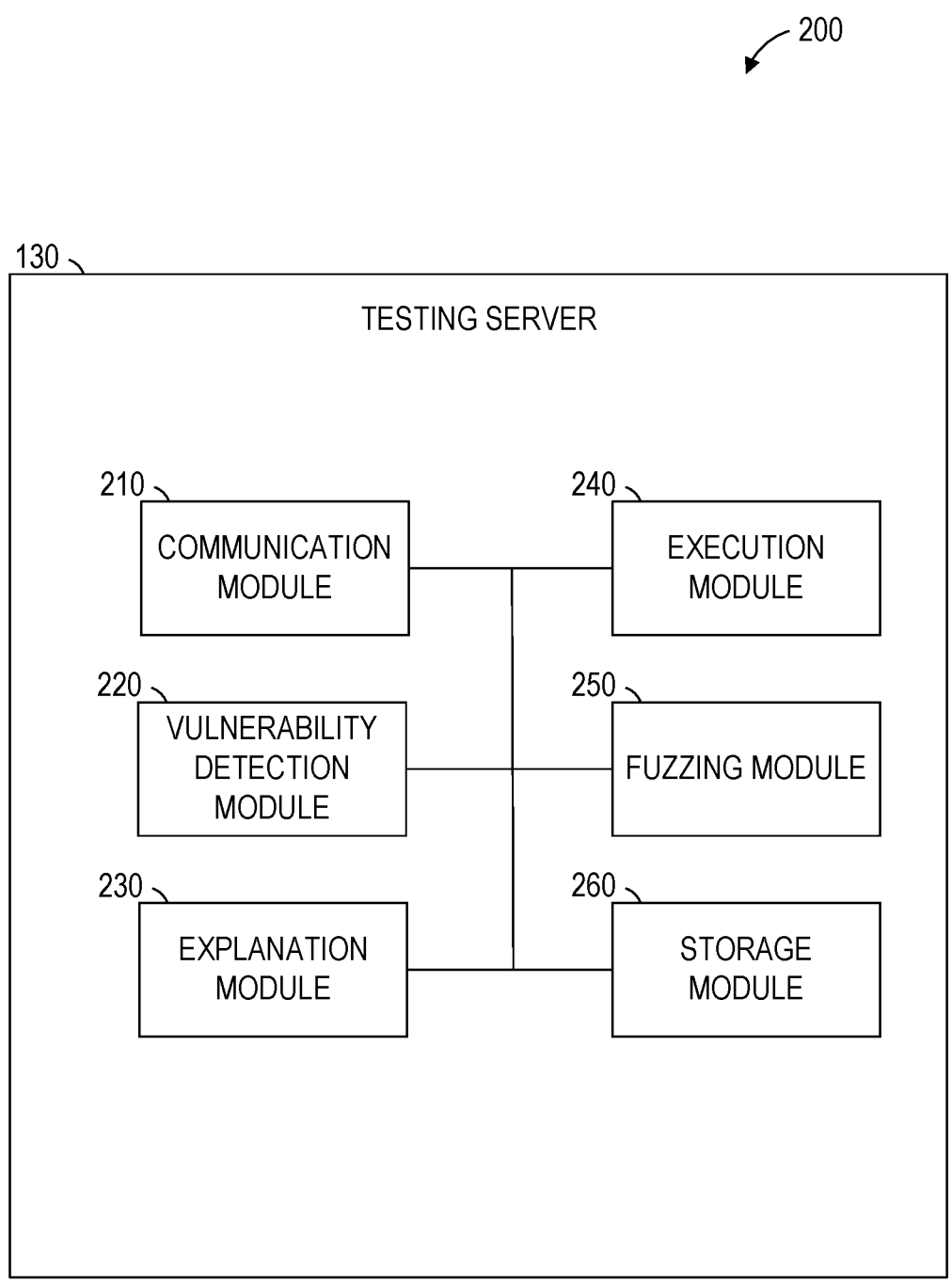
FIG. 2 is a block diagram of a testing server, according to some example embodiments, suitable for using directed fuzzing for vulnerability detection.

FIG. 2 is a block diagram 200 of a testing server 130, according to some example embodiments, suitable for using directed fuzzing for vulnerability detection. The testing server 130 is shown as including a communication module 210, a vulnerability detection module 220, an explanation module 230, an execution module 240, a fuzzing module 250, and a storage module 260, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the testing server 130 and transmits data from the testing server 130. For example, the communication module 210 may receive, from the client devices 150A-150B, a selection of an application to test. As another example, the communication module 210 may receive, from the development server 120, source code or executable applications for the application to test. Communications sent and received by the communication module 210 may be intermediated by the network 180.

The vulnerability detection module 220 may be implemented as a trained machine learning model that takes source code or executable objects as input and generates a probability of a vulnerability existing in the input. The output of the trained machine learning model may be a vector, wherein each element of the vector indicates the probability of a corresponding vulnerability existing in the input.

Identification of locations in source code that cause vulnerabilities may be provided by the explanation module 230. For example, source code and the vector of vulnerability probabilities generated by the vulnerability detection module 220 may be provided to the explanation module 230 as input. The explanation module 230 tests the source code to identify locations within the source code that cause the identified vulnerabilities.

Source code or executable objects for the application being tested may be executed by the execution module 240. Input for the application may be retrieved from the database server 140 or generated by the testing server 130. For example, the fuzzing module 250 may be used to generate input. The execution module 240 may execute the application multiple times with different inputs generated by the fuzzing module 250.

The storage module 260 may store data locally on the testing server 130 (e.g., in a hard drive) or store data remotely. Examples of remote storage include network storage devices and the database server 140.

Figure 3:
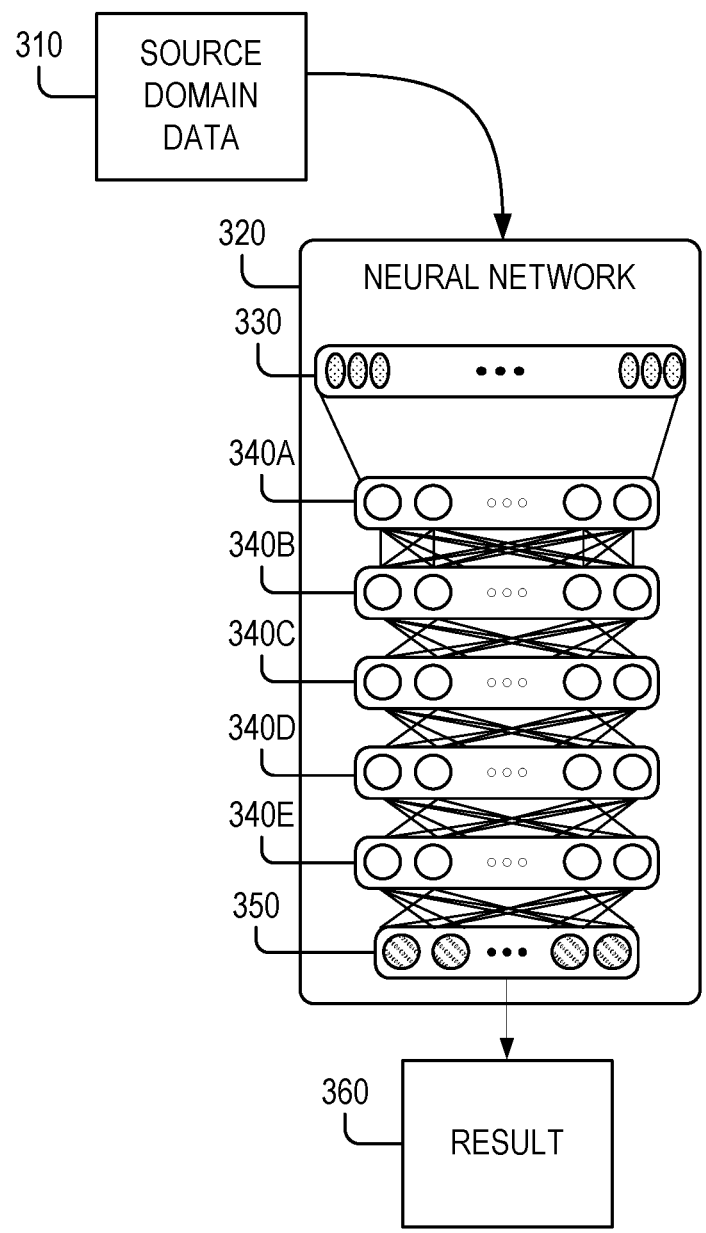
FIG. 3 illustrates the structure of a neural network, according to some example embodiments.

FIG. 3 illustrates the structure of a neural network 320, according to some example embodiments. The neural network 320 takes source domain data 310 as input, processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates an output value. The inputs to the input layer 330 are values from the source domain data 310. The output of the output layer 350 is the result 360. The intermediate layers 340A-340E are referred to as "hidden" because they do not interact directly with either the input or the output and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. In some example embodiments, the number of epochs is 10, 100, 500, or 1000. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the networked trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization.

The neural network 320 may be a deep learning neural network, a deep convolutional neural network, a recurrent neural network, or another type of neural network. A neuron is an architectural element used in data processing and artificial intelligence, particularly machine learning. A neuron implements a transfer function by which a number of inputs are used to generate an output. In some example embodiments, the inputs are weighted and summed, with the result compared to a threshold to determine if the neuron should generate an output signal (e.g., a 1) or not (e.g., a 0 output). The inputs of the component neurons are modified through the training of a neural network. One of skill in the art will appreciate that neurons and neural networks may be constructed programmatically (e.g., via software instructions) or via specialized hardware linking each neuron to form the neural network.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input. Thus, the coefficients assign significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight updates. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

In some example embodiments, the structure of each layer is predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, DNNs, genetic or evolutionary algorithms, and the like.

A machine learning model (e.g., the neural network 320) can be trained on historical (existing) source code and known vulnerabilities. For example, the source code can be converted to a vector. The vector may be provided as an input to the neural network 320 and the result 360 may indicate whether (and which) vulnerabilities are predicted to exist in the source code.

Graph neural networks (GNN) may be used to process graph-based program representations. GNNs are deep learning models that take advantage of the graph structure in the input data and realize a function $f: G(V, E) \mapsto \to y \in R^d$ that can be used for classification tasks. GNNs may be message-passing networks (MPN) where the prediction function is computed by iteratively aggregating and updating information from neighboring nodes.

FIG. 4 is an example of source code 400, according to some example embodiments, suitable for use in using directed fuzzing for vulnerability detection. The source code 400 creates a character pointer, buf, and attempts to allocate 32 characters of memory to the pointer. If the memory allocation fails, the error is caught and an error message is presented. Otherwise, the character "a" is written to a location past the end of the allocated region. Then the allocated memory is released and the program ends.

Different explanation methods may identify different locations within the source code 400 for vulnerabilities. For example, a first explanation method may identify the location 410 as causing the vulnerability, a second explanation method may identify the locations 420A and 420B as causing the vulnerability, and a third explanation method may identify the location 430 as causing the vulnerability. The three different explanations provide little guidance to a software engineer as to which location actually causes the vulnerability.

Machine-learning approaches typically use vector representations as input. Some approaches apply methods from natural language processing (NLP) to derive a suitable feature vector x for a given source code. In this case, the statements are regarded as sentences while keywords and literals form the words. Doing so yields a sequential data corpus that can be numerically encoded.

Alternatively, source code can also be modeled inherently as a directed graph $G=G(V, E)$ with vertices V and edges $E \subseteq V \times V$. Both nodes and edges of the graphs can have attributes in a suitable feature space. The resulting program representations are referred to as code graphs. They can capture syntactic and semantic relations between statements and expressions inside code. Popular graphs are the abstract syntax tree (AST) and flow graphs that encompass data and control flow. Similarly, a structure called program dependence graph (PDG) describes control and data dependencies in a joint form. Combined graphs may be used for vulnerability discovery, in particular the code property graph (CPG), which resembles a combination of the AST, CFG, and PDG. Each node of the graph may include data indicting the starting and end line numbers in the source code that correspond to the node. The same source code lines may be marked as relevant for multiple nodes. To determine the relevance of each source code line, the AST may be traversed and the relevance scores for each line aggregated as a weighted average.

Figure 5:
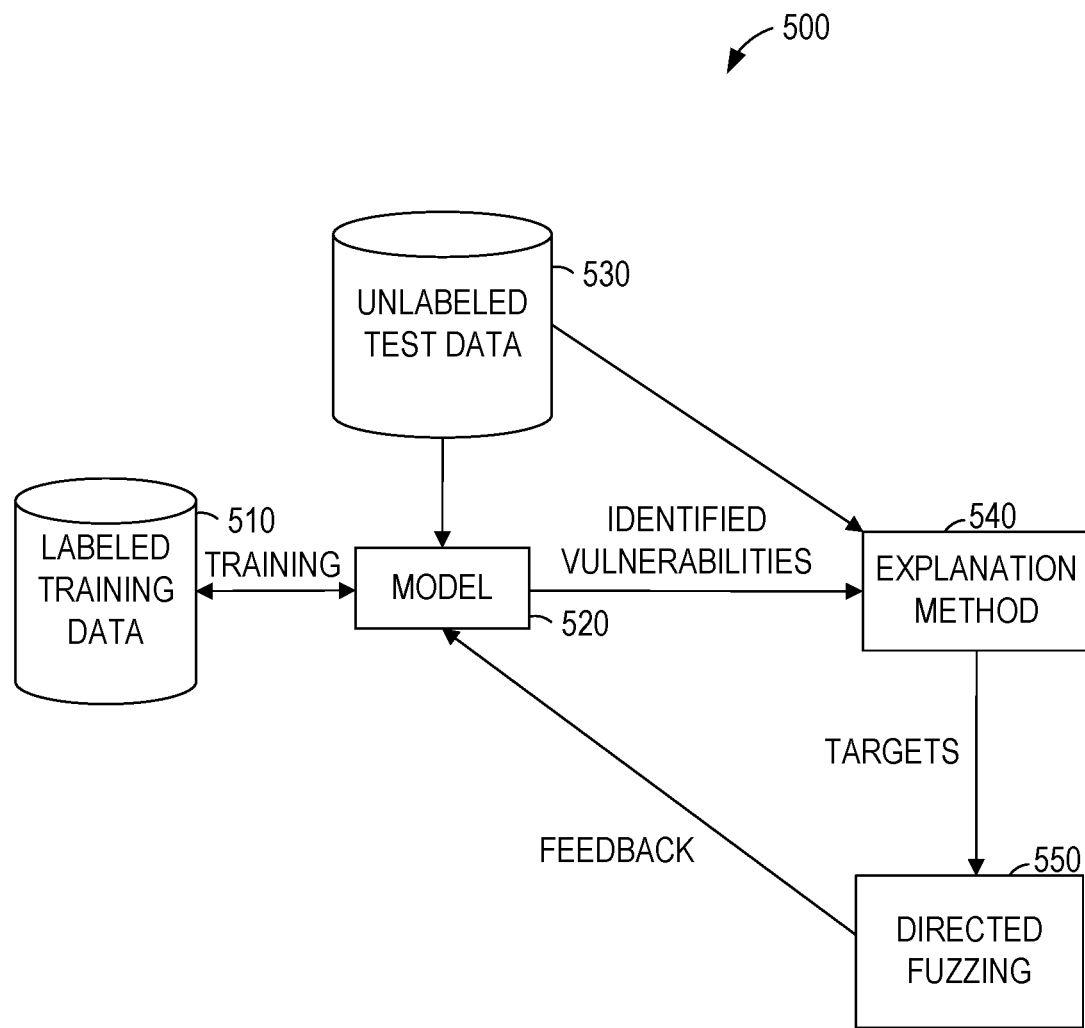
FIG. 5 is a block diagram illustrating a method of using directed fuzzing for vulnerability detection to improve a machine-learning model that detects vulnerabilities, according to some example embodiments.

FIG. 5 is a block diagram illustrating a method 500 of using directed fuzzing for vulnerability detection to improve a machine-learning model 520 that detects vulnerabilities, according to some example embodiments. The machine-learning model 520 is trained using labeled training data 510. For example, the labeled training data 510 may comprise labeled source code that indicates whether each source code contains a vulnerability or not.

Unlabeled test data 530 (e.g., source code) is provided to the model 520 and the model 520 determines whether the input contains vulnerabilities. The unlabeled test data 530 is also provided to one or more explanation methods 540. Each explanation method 540 identifies locations in the source code that are predicted to contain vulnerabilities (e.g., by generating a map that attributes numerical relevance scores to locations in the source code). Thus, two different explanation methods 540 may generate two different maps that each attribute numerical relevance scores to locations in the source code. The locations in the source code are potential interesting code regions until they are verified as actually containing vulnerabilities.

The identified vulnerabilities generated by the machine-learning model 520 may be paired with the corresponding source code and used by the one or more explanation methods 540 as part of the location-identification process. The identified locations are treated as targets and directed fuzzing 550 is performed on the targets. The directed fuzzing 550 provides a range of input to test the performance of the targets and detect vulnerabilities in the source code experimentally (e.g., by determining if any input causes a crash, erroneous functioning, access of unallocated memory, a core dump, or any suitable combination thereof).

Directed fuzzers belong to the category of grey-box fuzzers which make use of easy-to-gather information about the program under test (PUT) and abstain from costly computations. For instance, these fuzzers use efficient code instrumentation to monitor code coverage and execution paths. A directed fuzzer retrieves a set of target lines and files to find an input that both crashes the PUT and finds paths that minimize the distance of the execution trace to the targets. For instance, the directed fuzzer may calculate control-flow and call-graph distances prior to the fuzzing process, when instrumenting the PUT at compile time.

In some example embodiments, all identified targets are tested using the directed fuzzing 550. In other example embodiments, a predetermined number of the identified locations are tested using the directed fuzzing 550. For example, the potential interesting code regions may be sorted by relevance and the top 1, top 3, top 5, or top 10 potential interesting code regions may be tested.

A debugger may be used to execute a PUT with the generated seeds from the Fuzzer and with the relevant lines set as breakpoint. Using this approach, if the identified vulnerability exists, the directed fuzzing 550 will reproduce the crash and provide additional information about the execution trace of the crash and, in particular, which of the given breakpoints were reached before.

If a target line triggers a breakpoint during the reproduction of a crash, that line can be considered to be associated with the vulnerability. The more breakpoints that are hit during the reproduction of the crash ($M_{count}$), the more relevant is the overall explanation provided by the corresponding explanation method 540. Additionally or alternatively, the average time that elapses from the breakpoint hits to the crash site may be measured ($M_{dist}$). If the lines from an explanation method 540 are closer to the crash site, they should be more relevant to the vulnerability. Accordingly, a target line from which it takes longer to reach the crash site is less relevant for a security practitioner who then would have to spend more time to traverse the code and find the connection between the explanation and the actual cause.

Both $M_{count}$ and $M_{dist}$ give numerical quantities from which a (weighted) average A can be formed that measures how well the hypothetical vulnerability in the code x can be reproduced. If A is above a threshold T then x will be labeled as malicious (y=1) else as benign (y=0).

The results of the directed fuzzing 550(y) are provided as feedback to the machine-learning model 520. For example, if the machine-learning model 520 determined that an element of the unlabeled test data 530 contained a vulnerability, but the directed fuzzing 550 did not verify the existence of the vulnerability because the source code performed properly under all provided inputs, the feedback to the machine-learning model 520 would indicate that the detection of the vulnerability was in error. Accordingly, the machine-learning model 520 can be trained on the elements of the unlabeled test data 530, further improving the accuracy of the machine-learning model 520.

Figure 6:
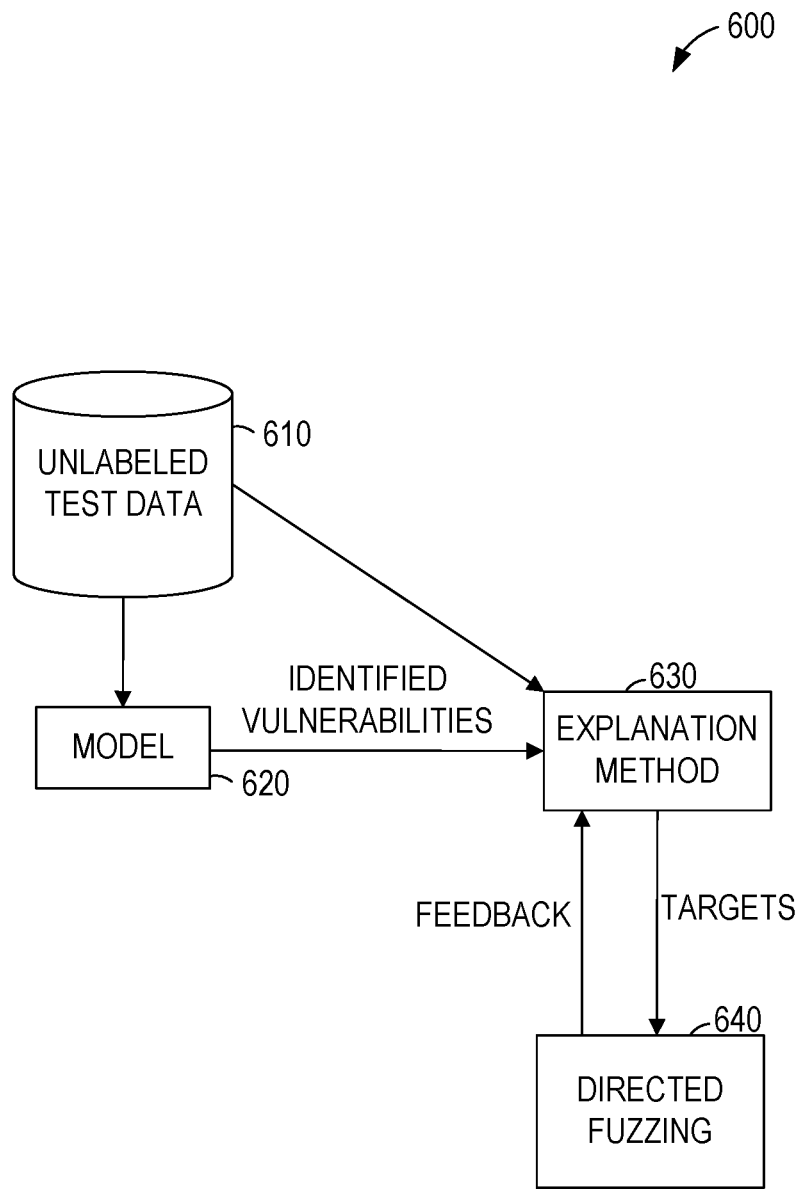
FIG. 6 is a block diagram illustrating a method of using directed fuzzing for vulnerability detection to improve an explanation method that identifies explanations for vulnerabilities, according to some example embodiments.

FIG. 6 is a block diagram 600 illustrating a method of using directed fuzzing for vulnerability detection to improve an explanation method 630 that identifies explanations for vulnerabilities, according to some example embodiments. The unlabeled test data 610 (e.g., source code) is provided to the machine-learning model 620 as input. The machine-learning model 620 determines if a vulnerability exists in the input. If a vulnerability exists, the unlabeled test data 610 is provided to the explanation method 630 to determine a location of the vulnerability in the source code.

The explanation method 630 identifies one or more target locations within the source code as output. The identified target locations "explain" the vulnerability. The directed fuzzing 640 provides a range of inputs to the source code, targeting the identified locations. The directed fuzzing 640 detects the locations of vulnerabilities experimentally (e.g., by determining which location in the source code causes a crash, erroneous functioning, access of unallocated memory, a core dump, or any suitable combination thereof). The results of the directed fuzzing 640 are provided as feedback to the explanation method 630. Accordingly, the explanation method 630 can be modified to improve the ability to identify locations of vulnerabilities.

Figure 7:
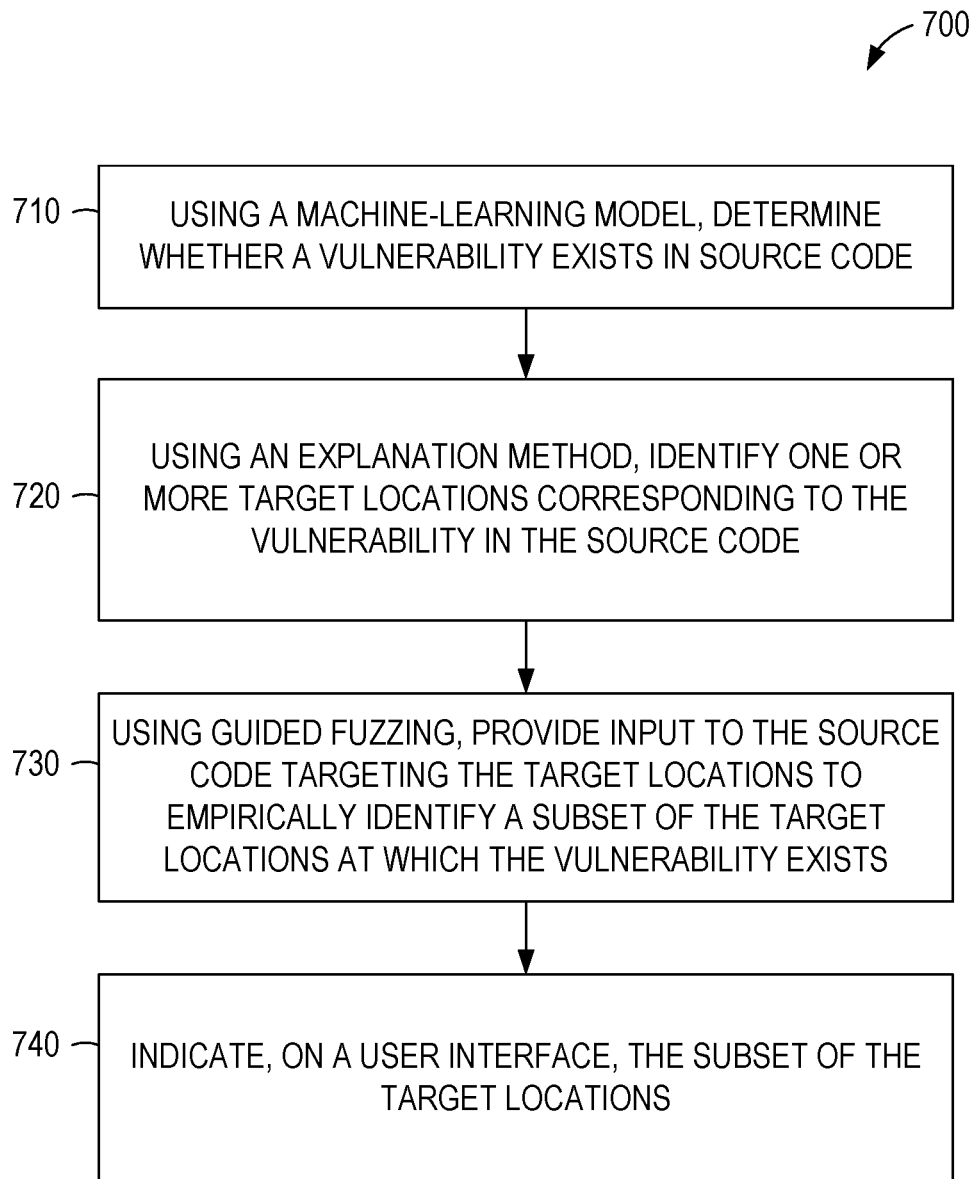
FIG. 7 is a flowchart illustrating operations of a method suitable for improving explanations for vulnerabilities using directed fuzzing, according to some example embodiments.

FIG. 7 is a flowchart illustrating operations of a method 700 suitable for improving explanations for vulnerabilities using directed fuzzing, according to some example embodiments. The method 700 includes operations 710, 720, 730, and 740. By way of example and not limitation, the method 700 may be performed by the testing server 130 of FIG. 1, using the modules, databases, source code, and structures shown in FIGS. 2-6.

In operation 710, the vulnerability detection module 220, using a machine-learning model, determines whether a vulnerability exists in source code. For example, the source code 400 of FIG. 4 may be provided as input to the trained neural network 320 of FIG. 3 to determine that a memory access error exists in the source code 400. The machine-learning model may identify multiple vulnerabilities.

The explanation module 230, in operation 720, identifies one or more target locations corresponding to the vulnerability in the source code. For example, the source code may be tested for each identified vulnerability and the lines of source code that cause the vulnerability may be identified (e.g., the lines of source code of the location 430 of FIG. 4). The identification of the lines of source code that cause the vulnerability may be based on heuristics or by application of a trained machine-learning model to the source code. Operation 720 may be repeated for multiple explanation methods.

A subset of the target locations at which the vulnerability exists is empirically determined by using guided fuzzing to provide input to the source code targeting the target locations (operation 730). The fuzzing module 250 provides a range of inputs to the source code and actual instances of the vulnerabilities (e.g., memory buffer overrun) are observed. Thus, the predictions made by the explanation module 230 in operation 720 may be confirmed, rejected, or modified based on actual execution of the source code in question. For example, guided fuzzing (also known as greybox fuzzing) may be used. Guided fuzzing uses program instrumentation to trace the code coverage reached by each input fed to a target location. The fuzzing module 250 may use this information to make informed decisions about which inputs to mutate to maximize coverage.

In operation 740, the testing server 130 indicates on a user interface the subset of the target locations at which the vulnerability was empirically determined to exist. For example, a user interface may be provided that shows the source code 400 of FIG. 4 with the lines of code that were confirmed to contain vulnerabilities in operation 730 highlighted. The lines of code identified by explanation methods in operation 720 that were not confirmed may not be highlighted. Thus, the attention of a software developer is efficiently directed to the lines of code that cause the vulnerabilities.

As a result of the method 700, results generated by explanation methods are improved. The refined set of lines of code may be presented on a display device to a software developer, who is enabled to more efficiently find and correct problems in source code. Accordingly, use of the method 700 improves existing software development systems.

Figure 8:
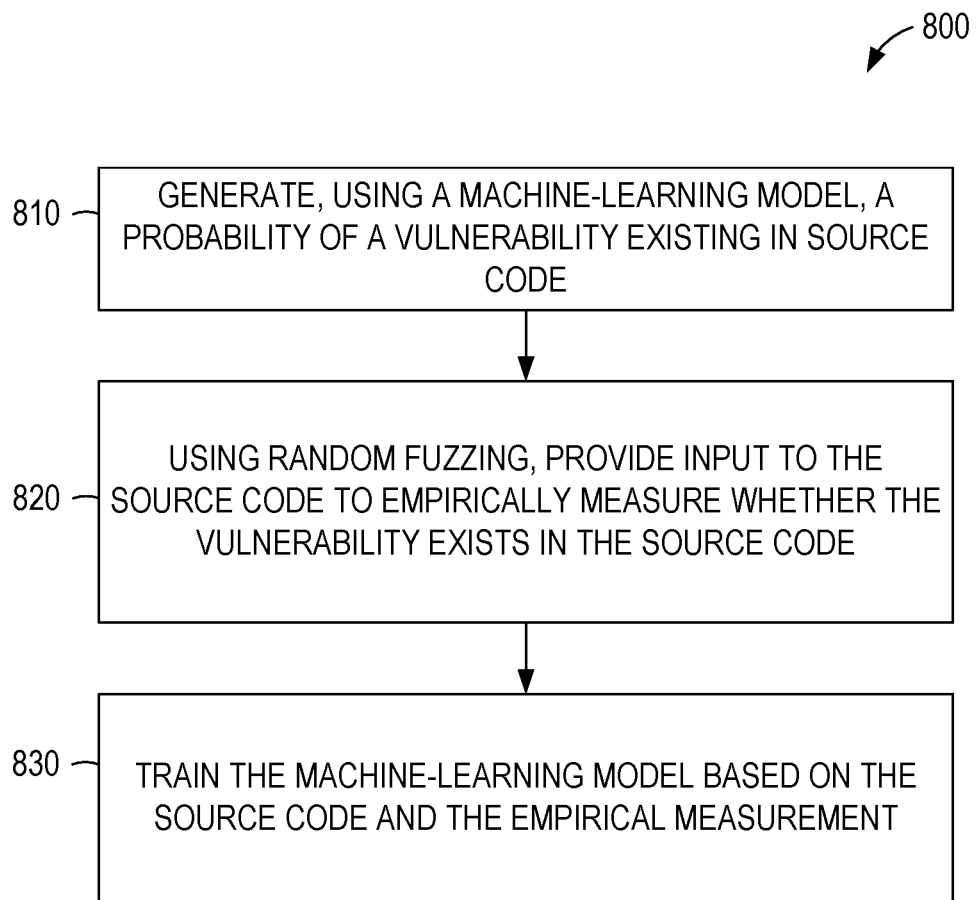
FIG. 8 is a flowchart illustrating operations of a method suitable for improving machine-learning models that detect vulnerabilities by using directed fuzzing, according to some example embodiments.

FIG. 8 is a flowchart illustrating operations of a method 800 suitable for improving machine-learning models that detect vulnerabilities by using directed fuzzing, according to some example embodiments. The method 800 includes operations 810, 820, and 830. By way of example and not limitation, the method 800 may be performed by the testing server 130 of FIG. 1, using the modules, databases, source code, and structures shown in FIGS. 2-6.

In operation 810, the vulnerability detection module 220, using a machine-learning model, generates a probability of a vulnerability existing in source code for a PUT. For example, the source code 400 of FIG. 4 may be provided as input to the trained neural network 320 of FIG. 3 to generate a vector of vulnerability probabilities, with each entry in the vector indicating a probability of a different vulnerability.

The fuzzing module 250, in operation 820, uses random fuzzing to provide input to the source code to empirically measure whether the vulnerability exists in the source code. For example, one or more explanation models may be used to identify locations in the source code that are likely to cause the vulnerability. The PUT is executed with random inputs that are directed to the identified locations and any crashes of the PUT are detected. In various examples, different thresholds are used to determine if the vulnerability exists. For example, if any of the inputs cause the PUT to crash, the vulnerability may be considered to have been empirically verified. As another example, the vulnerability may be considered to have been empirically verified only if the percentage of inputs that cause the crash exceeds a predetermined threshold (e.g., 1% or 10%). Operation 820 may be repeated for each vulnerability in a vector generated by the machine-learning model in operation 810.

In operation 830, based on the empirical measurement and the source code, the testing server 130 trains the machine-learning model. For example, a vector indicating which vulnerabilities were determined to exist in operation 820 may be provided as the label for the source code. The labeled source code may be used to train the machine-learning model. In some example embodiments, line numbers for locations identified by an explanation method are used as part of the training of the machine-learning model.

Accordingly, by use of the method 800, unlabeled source code is labeled and used to enhance the training of a machine-learning model for detecting vulnerabilities in source code. The methods 700 and 800 may be combined to use directed fuzzing both for providing feedback to explanation methods and to enhance training of a machine-learning model for detecting vulnerabilities.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory that stores instructions; and one or more processors configured by the instructions to perform operations comprising: generating, using a machine-learning model, a probability of a vulnerability existing in source code; using random fuzzing, providing input to the source code to empirically measure whether the vulnerability exists in the source code; and training the machine-learning model based on the source code and the empirical measurement.

In Example 2, the subject matter of Example 1, wherein the operations further comprise: generating, based on the source code and the probability, a map that attributes numerical relevance scores to locations in the source code; and sorting the locations of the map by relevance.

In Example 3, the subject matter of Example 2, wherein the providing of the input to the source code using random fuzzing comprises using guided fuzzing with the locations as targets to provide input to the source code.

In Example 4, the subject matter of Examples 1-3, wherein the operations further comprise: identifying, using one or more explanation methods, one or more locations in the source code that may cause the vulnerability; wherein the providing of the input to the source code comprises running the source code in a debugger with breakpoints set at the one or more locations.

In Example 5, the subject matter of Example 4, wherein the empirical measurement is based on mean breakpoint hits when running the source code in the debugger.

In Example 6, the subject matter of Examples 4-5, wherein the empirical measurement is based on a mean crash distance between the one or more locations and locations where the source code crashes.

In Example 7, the subject matter of Examples 4-6, wherein the identifying of the one or more locations in the source code that may cause the vulnerability comprises: converting the source code to a graph representation; providing the graph representation to the one or more explanation methods; receiving one or more graph locations from the one or more explanation methods; and converting the one or more graph locations to one or more line numbers in the source code.

Example 8 is a method comprising: generating, by one or more processors using a machine-learning model, a probability of a vulnerability existing in source code; using random fuzzing, providing input to the source code to empirically measure whether the vulnerability exists in the source code; and training, by the one or more processors, the machine-learning model based on the source code and the empirical measurement.

In Example 9, the subject matter of Example 8 includes, generating, by the one or more processors, based on the source code and the probability, a map that attributes numerical relevance scores to locations in the source code; and sorting the locations of the map by relevance.

In Example 10, the subject matter of Example 9, wherein the providing of the input to the source code using random fuzzing comprises using guided fuzzing with the locations as targets to provide input to the source code.

In Example 11, the subject matter of Examples 8-10 includes identifying, using one or more explanation methods, one or more locations in the source code that may cause the vulnerability; wherein the providing of the input to the source code comprises running the source code in a debugger with breakpoints set at the one or more locations.

In Example 12, the subject matter of Example 11, wherein the empirical measurement is based on mean breakpoint hits when running the source code in the debugger.

In Example 13, the subject matter of Examples 11-12, wherein the empirical measurement is based on a mean crash distance between the one or more locations and locations where the source code crashes.

In Example 14, the subject matter of Examples 11-13, wherein the identifying of the one or more locations in the source code that may cause the vulnerability comprises: converting the source code to a graph representation; providing the graph representation to the one or more explanation methods; receiving one or more graph locations from the one or more explanation methods; and converting the one or more graph locations to one or more line numbers in the source code.

Example 15 is a non-transitory computer-readable medium that stores instructions that, when executed by one or more processors, cause the one or more processors to perform operations comprising: generating, using a machine-learning model, a probability of a vulnerability existing in source code; using random fuzzing, providing input to the source code to empirically measure whether the vulnerability exists in the source code; and training the machine-learning model based on the source code and the empirical measurement.

In Example 16, the subject matter of Example 15, wherein the operations further comprise: generating, based on the source code and the probability, a map that attributes numerical relevance scores to locations in the source code; and sorting the locations of the map by relevance.

In Example 17, the subject matter of Example 16, wherein the providing of the input to the source code using random fuzzing comprises using guided fuzzing with the locations as targets to provide input to the source code.

In Example 18, the subject matter of Examples 15-17, wherein the operations further comprise: identifying, using one or more explanation methods, one or more locations in the source code that may cause the vulnerability; wherein the providing of the input to the source code comprises running the source code in a debugger with breakpoints set at the one or more locations.

In Example 19, the subject matter of Example 18, wherein the empirical measurement is based on mean breakpoint hits when running the source code in the debugger.

In Example 20, the subject matter of Examples 18-19, wherein the empirical measurement is based on a mean crash distance between the one or more locations and locations where the source code crashes.

Example 21 is at least one machine-readable medium including instructions that, when executed by processing circuitry, cause the processing circuitry to perform operations to implement of any of Examples 1-20.

Example 22 is an apparatus comprising means to implement any of Examples 1-20.

Example 23 is a system to implement any of Examples 1-20.

Example 24 is a method to implement any of Examples 1-20.

Figure 9:
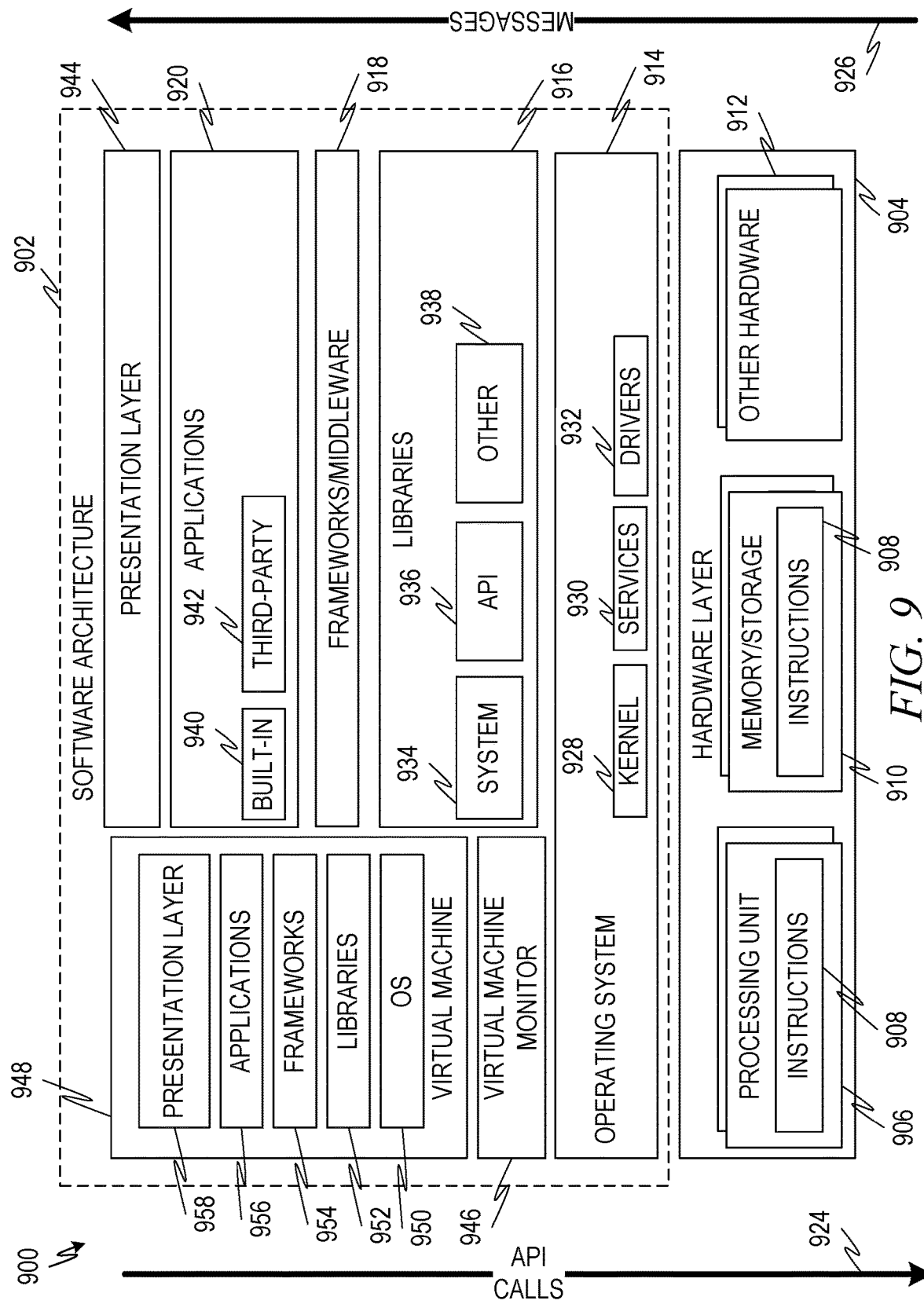
FIG. 9 is a block diagram showing one example of a software architecture for a computing device.

FIG. 9 is a block diagram 900 showing one example of a software architecture 902 for a computing device. The architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 9.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912 which represents any other hardware of the hardware layer 904, such as the other hardware illustrated as part of the software architecture 902.

In the example architecture of FIG. 9, the software architecture 902 may be conceptualized as a stack of layers where each layer provides particular functionality. For example, the software architecture 902 may include layers such as an operating system 914, libraries 916, frameworks/middleware layer 918, applications 920, and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware layer 918 may provide a higher-level common infrastructure that may be utilized by the applications 920 and/or other software components/modules. For example, the frameworks/middleware layer 918 may provide various graphic user interface (GUI) functions, high-level resource management, high-level location services, and so forth. The frameworks/middleware layer 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built in operating system functions (e.g., kernel 928, services 930 and/or drivers 932), libraries (e.g., system libraries 934, API libraries 936, and other libraries 938), and frameworks/middleware layer 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine 948 as well as the interface with the host operating system (i.e., operating system 914). A software architecture executes within the virtual machine 948 such as an operating system 950, libraries 952, frameworks/middleware layer 954, applications 956 and/or presentation layer 958. These layers of software architecture executing within the virtual machine 948 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
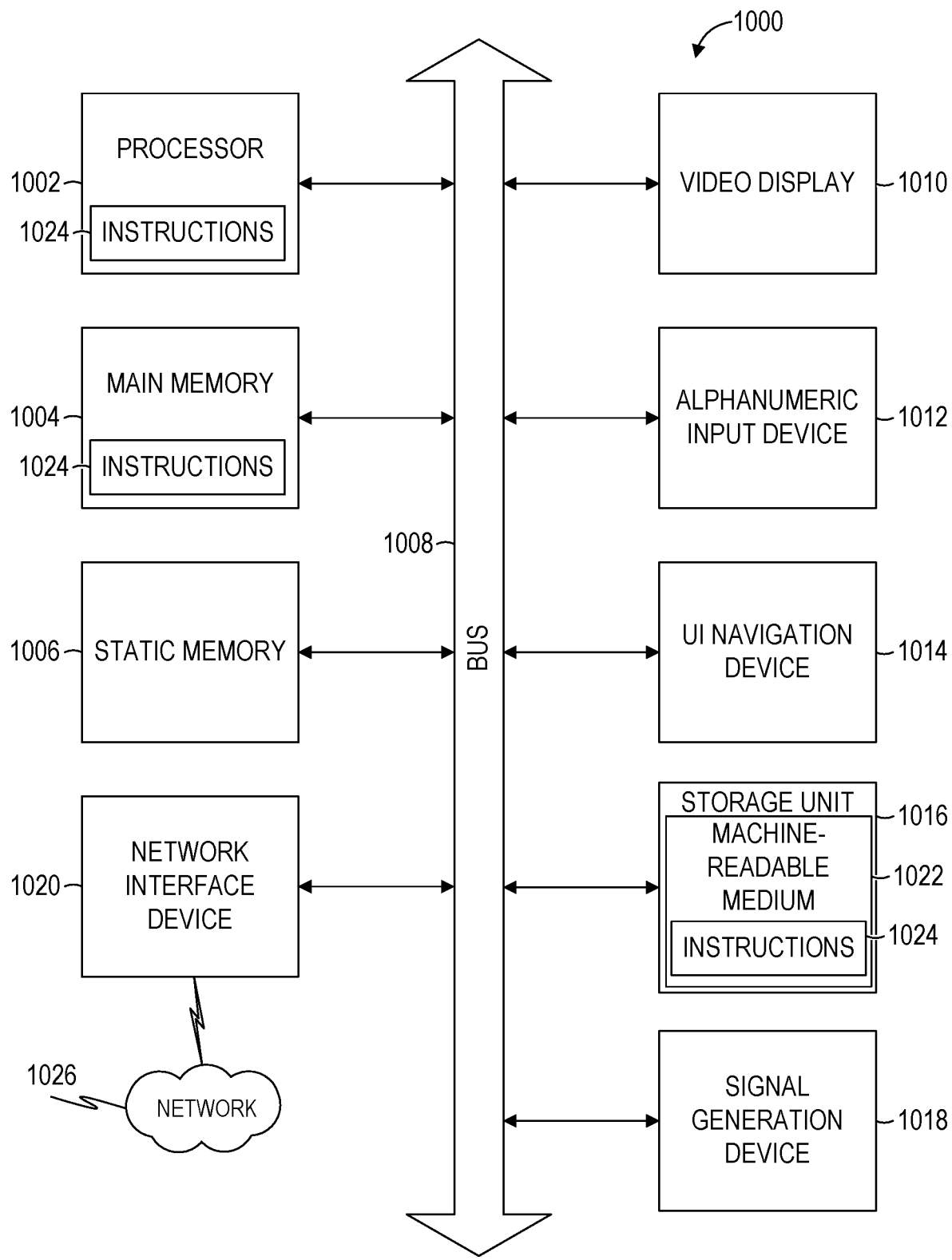
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a storage unit 1016, a signal generation device 1018 (e.g., a speaker), and a network interface device 1020.

Machine-Readable Medium

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1024 may further be transmitted or received over a communications network 1026 using a transmission medium. The instructions 1024 may be transmitted using the network interface device 1020 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although specific example embodiments are described herein, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:
    a memory that stores instructions; and
    one or more processors configured by the instructions to perform operations comprising:
        generating, using a machine-learning model, a probability of a vulnerability existing in source code;
        identifying, using one or more explanation methods, one or more locations in the source code that may cause the vulnerability;
        based on the probability of the vulnerability existing, using random fuzzing, providing input to the source code to empirically measure whether the vulnerability exists in the source code, wherein the providing of the input to the source code comprises running the source code in a debugger with breakpoints set at the one or more locations; and
        training the machine-learning model based on the source code and the empirical measurement.

2. The system of claim 1, wherein the operations further comprise:
    generating, based on the source code and the probability, a map that attributes numerical relevance scores to locations in the source code; and
    sorting the locations of the map by relevance.

3. The system of claim 2, wherein the providing of the input to the source code using random fuzzing comprises using guided fuzzing with the locations as targets to provide input to the source code.

4. The system of claim 1, wherein the empirical measurement is based on mean breakpoint hits when running the source code in the debugger.

5. The system of claim 1, wherein the empirical measurement is based on a mean crash distance between the one or more locations and locations where the source code crashes.

6. The system of claim 1, wherein the identifying of the one or more locations in the source code that may cause the vulnerability comprises:
   converting the source code to a graph representation;
   providing the graph representation to the one or more explanation methods;
   receiving one or more graph locations from the one or more explanation methods; and
   converting the one or more graph locations to one or more line numbers in the source code.

7. A method comprising:
   generating, by one or more processors using a machine-learning model, a probability of a vulnerability existing in source code;
   identifying, using one or more explanation methods, one or more locations in the source code that may cause the vulnerability;
   based on the probability of the vulnerability existing, using random fuzzing, providing input to the source code to empirically measure whether the vulnerability exists in the source code, wherein the providing of the input to the source code comprises running the source code in a debugger with breakpoints set at the one or more locations; and
   training, by the one or more processors, the machine-learning model based on the source code and the empirical measurement.

8. The method of claim 7, further comprising:
   generating, by the one or more processors, based on the source code and the probability, a map that attributes numerical relevance scores to locations in the source code; and
   sorting the locations of the map by relevance.

9. The method of claim 8, wherein the providing of the input to the source code using random fuzzing comprises using guided fuzzing with the locations as targets to provide input to the source code.

10. The method of claim 7, wherein the empirical measurement is based on mean breakpoint hits when running the source code in the debugger.

11. The method of claim 7, wherein the empirical measurement is based on a mean crash distance between the one or more locations and locations where the source code crashes.

12. The method of claim 7, wherein the identifying of the one or more locations in the source code that may cause the vulnerability comprises:
   converting the source code to a graph representation;
   providing the graph representation to the one or more explanation methods;
   receiving one or more graph locations from the one or more explanation methods; and
   converting the one or more graph locations to one or more line numbers in the source code.

13. A non-transitory computer-readable medium that stores instructions that, when executed by one or more processors, cause the one or more processors to perform operations comprising:
   generating, using a machine-learning model, a probability of a vulnerability existing in source code;
   identifying, using one or more explanation methods, one or more locations in the source code that may cause the vulnerability;
   based on the probability of the vulnerability existing, using random fuzzing, providing input to the source code to empirically measure whether the vulnerability exists in the source code, wherein the providing of the input to the source code comprises running the source code in a debugger with breakpoints set at the one or more locations; and
   training the machine-learning model based on the source code and the empirical measurement.

14. The non-transitory computer-readable medium of claim 13, wherein the operations further comprise:
   generating, based on the source code and the probability, a map that attributes numerical relevance scores to locations in the source code; and
   sorting the locations of the map by relevance.

15. The non-transitory computer-readable medium of claim 14, wherein the providing of the input to the source code using random fuzzing comprises using guided fuzzing with the locations as targets to provide input to the source code.

16. The non-transitory computer-readable medium of claim 13, wherein the empirical measurement is based on mean breakpoint hits when running the source code in the debugger.

17. The non-transitory computer-readable medium of claim 13, wherein the empirical measurement is based on a mean crash distance between the one or more locations and locations where the source code crashes.

18. The system of claim 5, wherein the mean crash distance is measured by an average time that elapses from a breakpoint hit to a crash site.

19. The method of claim 11, wherein the mean crash distance is measured by an average time that elapses from a breakpoint hit to a crash site.

20. The non-transitory computer-readable medium of claim 17, wherein the mean crash distance is measured by an average time that elapses from a breakpoint hit to a crash site.

* * * * *